June 12, 1956
V. M. PREWETT
2,749,979
TIRE TRUEING MACHINE
Filed April 17, 1953
3 Sheets-Sheet 1
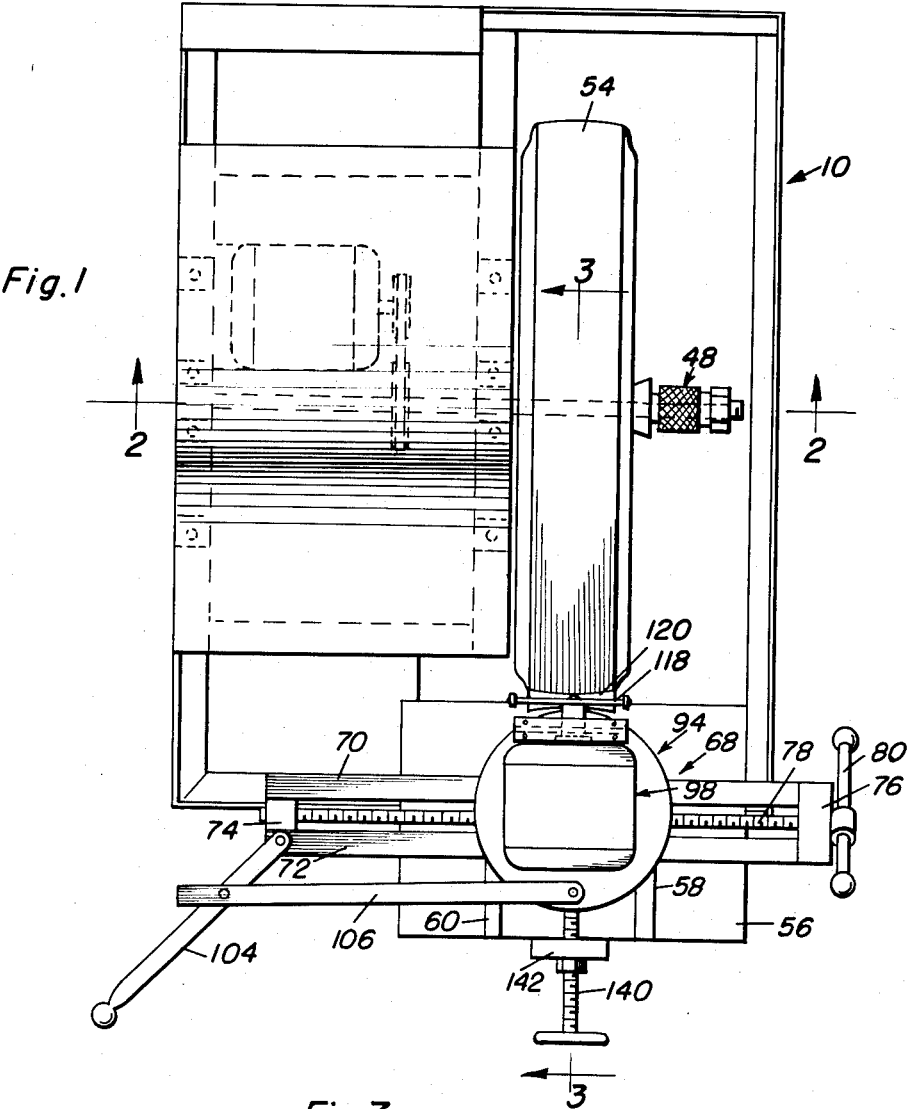
Verlyn M. Prewett
INVENTOR.

June 12, 1956  V. M. PREWETT  2,749,979
TIRE TRUEING MACHINE
Filed April 17, 1953  3 Sheets-Sheet 2
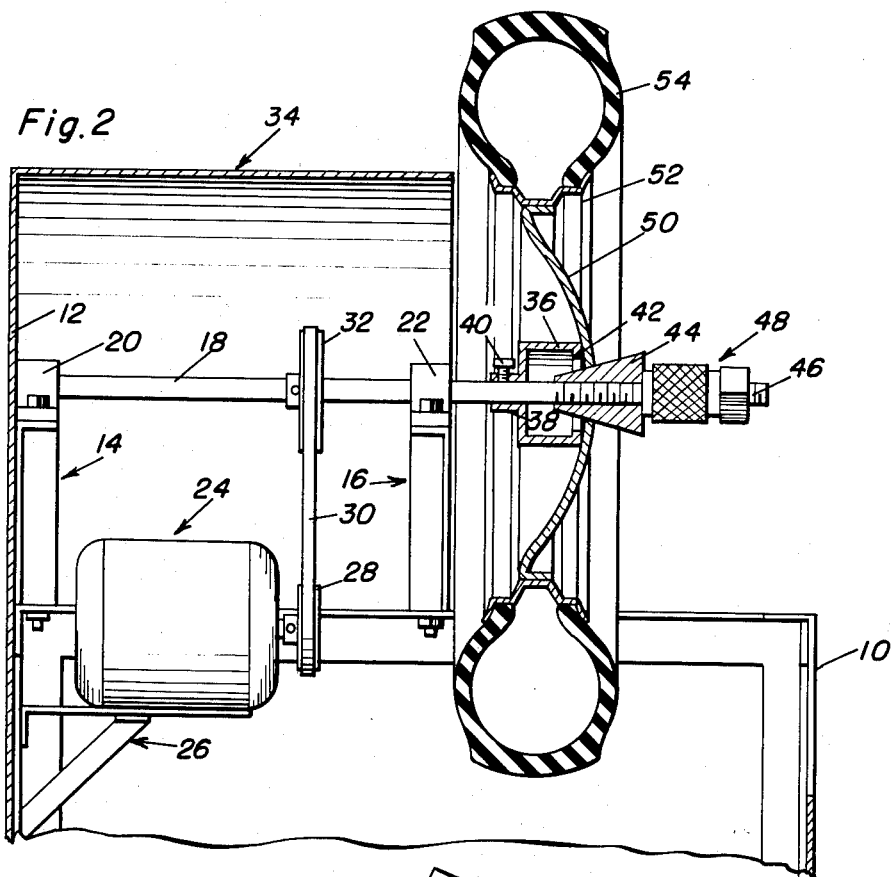
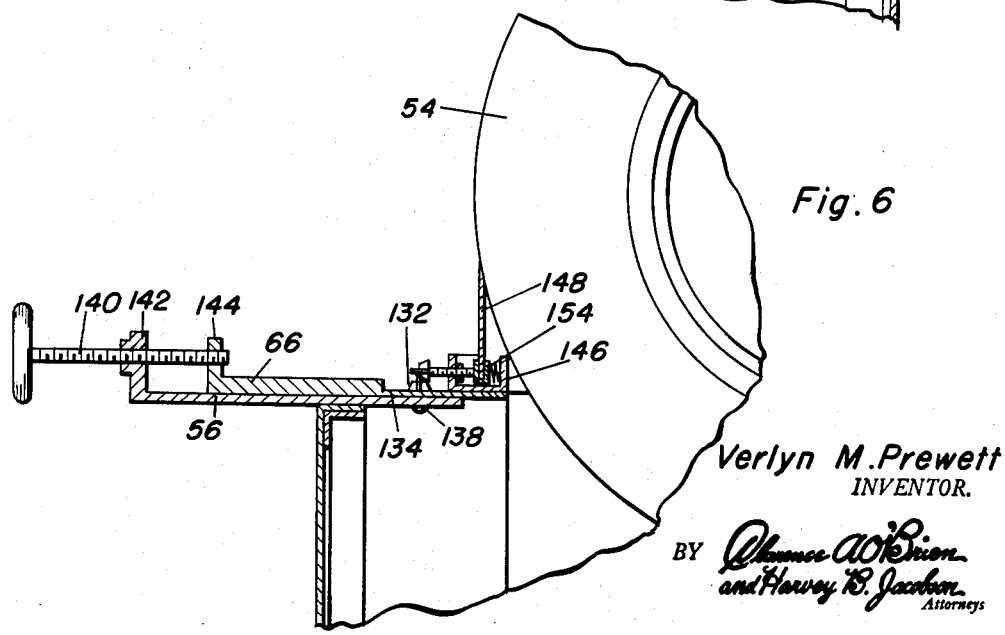
Verlyn M. Prewett
INVENTOR.

June 12, 1956 V. M. PREWETT 2,749,979
TIRE TRUEING MACHINE
Filed April 17, 1953 3 Sheets-Sheet 3
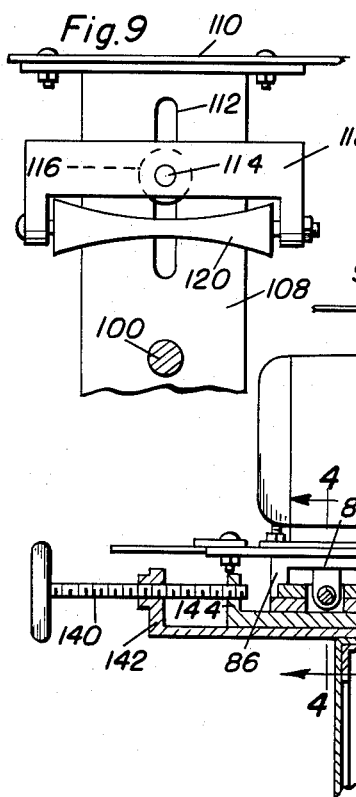
Verlyn M. Prewett
INVENTOR.

United States Patent Office 2,749,979
Patented June 12, 1956

2,749,979
TIRE TRUEING MACHINE

Verlyn M. Prewett, Cherokee, Okla.

Application April 17, 1953, Serial No. 349,406

4 Claims. (Cl. 164—10.2)

This invention relates generally to a machine for processing tires prior to recapping or retreading the same, and pertains more particularly to an improved form of tire casing trueing machine.

A primary object of this invention resides in the provision of a machine for trueing tires, particularly for trueing both new and used tires prior to balancing and/or using.

Another object of this invention is to provide an improved form of trueing machine which includes means for adjustably carrying a tire cutting tool so that the same may be rapidly and easily indexed with relation to the surface of a tire to be cut.

Another object of this invention is to provide an improved form of tire trueing machine which incorporates in its construction a unitary and effective mechanism for trueing tires.

Another object of this invention is to provide an improved form of tire trueing machine which includes guide mechanism for assuring the proper and desired cutting operation on a tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the trueing machine showing a tire mounted thereon;

Figure 2 is a vertical section taken substantially along the plane of section line 2—2 of Figure 1 showing details of the internal construction of the machine;

Figure 3 is a transverse vertical section taken substantially along the plane of section line 3—3 of Figure 1 showing details of the tool assembly on an enlarged scale;

Figure 4 is a vertical section taken along section line 4—4 of Figure 3 showing a portion of the tool assembly on an enlarged scale;

Figure 5 is a plan view of one of the auxiliary attachments;

Figure 6 is a vertical section on an enlarged scale showing the attachments of Figure 5 in use;

Figure 7 is a perspective view of a series of cutting tools to be utilized with the power cutting device as illustrated in Figure 1;

Figure 8 is a perspective view of various grinding stones which may be utilized with the power cutting assembly; and Figure 9 is a vertical section taken substantially along the plane of section line 9—9 of Figure 3 showing the guide means on an enlarged scale.

Referring now more particularly to the drawings, reference numeral 10 indicates generally the base of the trueing machine which may preferably be formed of hollow box-like configuration and which includes an upstanding side wall portion 12 as well as the upstanding bracket assemblies 14 and 16, the latter of which are adapted to rotatably receive a tire supporting shaft 18 in their bearing portions 20 and 22, respectively. A power source 24, preferably an electric motor, is suitably mounted on the bracket assembly 26 and includes the driven pulley 28 connected by means of belt 30 to a pulley 32 on the shaft 18 for imparting rotational movement to the latter. A hood assembly 34 is suitably secured to the base portion in covering relation to the power source and the main portion of the shaft 18.

A portion of the shaft 18 extends outwardly from the bracket 16 beyond the hood covering 34 and is provided thereon with a cylindrical wheel retaining member 36, one end of which is provided with a collar portion 38 secured by the set screw 40 to shaft 18 and the other end of which is provided with an aperture 42 through which the small end of a tapered retaining sleeve 44 is received. The extreme free end of the shaft 18 is threaded, as at 46, and is provided with a nut assembly 48 for engaging the member 44 towards the member 36 to clamp therebetween a wheel 50 in its central opening. This wheel is entirely conventional in nature and includes a rim portion 52 upon which is mounted a pneumatic tire 54 upon which the hereinafter described mechanism is to perform cutting operations.

Referring now more particularly to Figures 1, 3 and 4, reference numeral 56 indicates generally the main supporting table portion of this machine which is of generally rectangular configuration and which is elongated slightly in a direction parallel to the shaft 18, as will be readily apparent. This table is provided with a pair of track guides 58 and 60 which extend transversely of the table 56 and which receive therebetween the flanges 62 and 64 extending outwardly from the base 66 of the carriage assembly indicated generally by the reference character 68. The base portion 66 is secured to the elongated bed members 70 and 72 provided at their opposite ends with the cross-pieces 74 and 76 and between which is journaled the worm shaft 78, the manually operated handle 80 being disposed adjacent the cross-piece 76 outwardly thereof.

A stand 82 is of generally inverted U-shaped construction, having the spaced legs 84 and 86 whose free ends rest upon the upper surface of the members 70 and 72, respectively, and whose horizontal bight portion 88 is provided on its upper surface with a raised hub portion 90 for a purpose presently apparent. Directly beneath this raised portion is a depending nut member 92 which threadedly receives the worm shaft 78 so that actuation of the handle 80 imparts sliding motion of the stand with respect to the carriage.

The circular platform 94 is provided with a central opening 96 receiving the hub portion 90 on the table so that the platform is rotatably mounted thereon, and it will be readily apparent that this table carries a suitable power source 98 whose drive shaft 100 may be suitably connected to a cutting tool, as for example the blade 102 shown in Figure 3. Power source 98 is suitably rigidly secured to the platform 94 and is rotatable therewith. A manual lever 104 is pivotally secured at one end to the side member 72 of the carriage, and its intermediate portion is pivotally secured to an idler link 106 whose opposite end is pivotally secured to the platform 94 so that actuation of the handle portion 104 will impart rotary motion to the platform and to the tool mounted thereon.

Bracket 108 extends upwardly from the platform and is provided at its upper end with a shield 110 whereas its intermediate portion is provided with an elongated slot 112 through which a fastening element 114 extends to adjustably secure thereon the spacer element 116 and roller bracket 118 which pivotally supports the roller 120 thereon.

Referring now more particularly to Figures 7 and 8, various types of cutting blades 122, 124 and 126 are shown in Figure 7, while various types of abrasive wheels 128 and 130 are shown in Figure 8. These various tools are suitably secured to the drive shaft 100 of the power source 98 to perform various desired cutting operations on the tire casing 54.

In operation of the previously described assembly, it will be noted that the power source 98 is movable with respect to the tire casing both transversely and longitudinally with respect to the rotational axis thereof defined by the driving shaft 18 and also the angular disposition of the power source and tool with respect to the tire casing can be suitably controlled by the linkage mechanism 104 and 106 which imparts rotational movement to the platform 94. The guide roller 120 is in normal engagement with the outer surface of the tire casing and properly centers the powered tool rotationally with respect to the tire casing to maintain the tool in normal or perpendicular engagement with the portion of the tire casing surface which is being operated upon. This guide roller performs a further extremely important function inasmuch as it will be readily appreciated that the speed at which the tire casing 54 is rotated by the shaft 18 is relatively low so that the casing has a tendency to bulge or deflect under such rotational motion, and inasmuch as various portions of the casing will deflect more than others, the cutting operation performed by the tool 102 would be extremely uneven if the guide roller 120 were not used. This roller assures an even and accurate cut on the outer surface of the tire casing as is desired.

The tool is, of course, fed across the surface of the tire casing by manipulation of the worm shaft 78.

Referring now more particularly to Figures 5 and 6, it will be seen that in these figures, a modification of the previously described mechanism is effected wherein the table mechanism is removed and the cutter blade assembly 132 substituted therefor. This cutter blade assembly includes a plate 134 provided with the elongated slot 136 which mate with corresponding slots in the table 56 for receiving the fastening element 138. In this manner, transverse manipulation of the carriage 66 through the manually operated screw shaft 140 which engages through the corresponding upstanding ears 142 and 144 on the table and carriage, respectively, will effect transverse movement of the plate 134 toward and away from the tire casing 54. This plate is provided on its upper surface with an arcuate channel member 146 whose spaced upstanding legs receive therebetween the flexible blade member 148. One of the legs 150 of this channel member is provided with a plurality of apertures through which the fastening elements 152 extend, these fastening elements being provided at their free ends with slightly rounded end surfaces engaging against the U-shaped clips 154 engaged on the under edge of the flexible blade member 148 and these fastening elements may be manipulated through their corresponding adjusting nut members 156 to impart the desired arcuate shape to the flexible blade 148 so that the latter conforms in shape in the desired manner to the outer surface of the tire casing 54. Coil springs 158 are engaged between the other sides of the U-shaped clips 154 and the other leg 160 of the channel member to maintain the blade 148 in proper position between the legs 150 and 160, as will be readily apparent. The securing bolt 162 extends through both legs of the arcuate channel as well as the lower portion of the arcuate knife blade which is provided with elongated slots (not shown) through which these guide bolts pass and it will be readily apparent that the guide bolt serves to retain the blade between the legs of the arcuate channel and prevent its dislodgement therefrom. When it is desired to move the blade assembly toward or away from the tire casing, it is merely necessary to loosen the fastening members 138 and manipulate the carriage 66 in the appropriate direction, whereupon the fastening members are again tightened to maintain the blade assembly in fixed position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tool support for use in a tire trueing machine comprising an elongated table, a carriage disposed on said table, means on said table for moving the carriage transversely thereof, a stand on said table for supporting a tool engageable with a tire mounted on said shaft, said stand including a channel member having upstanding, spaced arcuate leg members, a resilient blade member having its lower edge disposed between said legs, a pair of securing members extending through said legs and said blade, a plurality of fastening members extending through one leg and engaging at their free ends with said blade, and resilient means disposed between the said blade and the other of said legs.

2. A tool support for use in a tire trueing machine comprising an elongated table, a carriage disposed on said table, means on said table for moving the carriage transversely thereof, a stand on said table for supporting a tool engageable with a tire mounted on said shaft, said stand including a channel member having upstanding, spaced arcuate leg member, a resilient blade member having its lower edge disposed between said legs, said blade having an elongated aperture adjacent each end, a pair of securing members projected through said legs and through corresponding apertures in said blade, a plurality of fastening elements projecting through one of said legs and engaging said blade, a plurality of coil springs disposed between said blade and the other of said legs, and nut members threaded on said fastening elements and engaged against the inner surface of said one leg whereby the blade may be deformed into a desired shape.

3. A tool support for use in a tire trueing machine comprising, a stand including a channel member having upstanding, spaced arcuate leg members, a resilient blade member having its lower edge disposed between said legs, a pair of securing members extending through said legs and said blade, a plurality of fastening members extending through one leg and engaging at their free ends with said blade, and resilient means disposed between said blade and the other of said legs.

4. A tool support for use in a tire trueing machine comprising, a stand including a channel member having upstanding, spaced arcuate leg members, a resilient blade member having its lower edge disposed between said legs, a pair of securing members extending through said legs and said blade, a plurality of fastening members extending through one leg and engaging at their free ends with said blade, a plurality of coil springs disposed between said blade and the other of said legs, and nut members threaded on said fastening elements and engaged against the inner surface of said one leg whereby the blade may be deformed into a desired shape.

References Cited in the file of this patent

UNITED STATES PATENTS

| Number | Name | Date |
|---|---|---|
| 1,489,922 | Brundage | Apr. 8, 1924 |
| 2,200,575 | Haskins | May 14, 1940 |
| 2,283,005 | Godfrey | May 12, 1942 |
| 2,294,047 | Pollock | Aug. 25, 1942 |
| 2,321,936 | Pollock | June 15, 1943 |
| 2,362,967 | Bivans | Nov. 21, 1944 |
| 2,598,206 | Walton | May 27, 1952 |
| 2,607,254 | Auerbach | Aug. 19, 1952 |
| 2,645,147 | Hawkinson | July 14, 1953 |